United States Patent
Miller et al.

(10) Patent No.: US 8,139,956 B2
(45) Date of Patent: Mar. 20, 2012

(54) BI-DIRECTIONAL SIGNAL TRANSMISSION SYSTEM USING A DUAL-PURPOSE PIN

(75) Inventors: Frederick W Miller, San Jose, CA (US); Michael A Robinson, Fremont, CA (US)

(73) Assignee: Avango Technologies Fiber IP (Singapore) Pte. Ltd (SG)

( * ) Notice: Subject to any disclaimer, the term of this patent is extended or adjusted under 35 U.S.C. 154(b) by 813 days.

(21) Appl. No.: 12/198,483

(22) Filed: Aug. 26, 2008

(65) Prior Publication Data
US 2010/0054754 A1    Mar. 4, 2010

(51) Int. Cl.
*H04B 10/04* (2006.01)
*H04B 10/12* (2006.01)

(52) U.S. Cl. .................. 398/197; 398/182; 398/195
(58) Field of Classification Search .......... 398/182, 398/195, 197, 198; 372/38.02, 38.07
See application file for complete search history.

(56) References Cited

U.S. PATENT DOCUMENTS

| | | | |
|---|---|---|---|
| 6,859,473 B1 * | 2/2005 | Tan | 372/38.02 |
| 2003/0193704 A1 | 10/2003 | Miremadi | |
| 2006/0257153 A1 * | 11/2006 | Furudate et al. | 398/202 |
| 2007/0248130 A1 * | 10/2007 | Ishibashi | 372/38.07 |

* cited by examiner

*Primary Examiner* — Kenneth N Vanderpuye
*Assistant Examiner* — Daniel Dobson

(57) ABSTRACT

A signal transmission system in accordance with the invention is implemented using a dual-purpose pin of an optical sub-assembly. The dual-purpose pin is used to propagate an analog signal out of the optical sub-assembly and also for providing an access point where an external element may be coupled to the optical sub-assembly for modulating the analog signal. The optical sub-assembly houses a photodetector, a signal transmitter circuit, and a signal receiver circuit. The photodetector receives light and generates a corresponding electrical signal indicative of the light intensity. The signal transmitter circuit converts the electrical signal received from the photodetector into the analog signal that is transmitted out of the dual-purpose pin. The signal receiver circuit located inside the optical sub-assembly is configured to monitor the modulated analog signal from the dual-purpose pin and generate therefrom, a control signal inside the optical sub-assembly.

22 Claims, 10 Drawing Sheets

BI-DIRECTIONAL SIGNAL TRANSMISSION SYSTEM USING A DUAL-PURPOSE PIN

BACKGROUND

When packaging electronic circuitry inside an integrated circuit (IC) or a sub-assembly, it is desirable to maximize certain parameters such as circuit density, input/output availability, and circuit functionality, while minimizing certain other parameters such as power consumption, package size and pin count.

Towards this end, a 5-pin sub-assembly package has been traditionally used to house an optical device such as an optical receiver or an optical transmitter together with their associated electronic circuitry. One such optical device is an optical receiver package commonly referred to as a receiver optical sub-assembly (ROSA). A 5-pin ROSA incorporates a first pin that is used for connecting to a positive voltage, a second pin for connecting to ground, third and fourth pins for outputting a differential data signal derived from an optical signal received in the ROSA, and a fifth pin that outputs a monitor signal representing the signal strength of the received optical signal. As can be appreciated, this type of predetermined pin assignment places severe limitations on any additional functionality that can be provided by the ROSA. For example, the lack of an input pin prevents a user of the device from feeding a desired control signal into the ROSA.

As a further example, another traditional optical device is an optical transmitter circuit commonly referred to as a transmitter optical sub-assembly (TOSA). A 5-pin TOSA typically incorporates a first pin that is used for connecting to a positive voltage, a second pin for connecting to ground, third and fourth pins for receiving a differential electrical data signal that is converted into an optical signal for transmission out of the TOSA, and a fifth pin that outputs a monitor signal representing the signal strength of the transmitted optical signal. Here again, the predetermined pin structure places undesirable constraints upon a user of the device.

SUMMARY

A signal transmission system in accordance with the invention is implemented using a dual-purpose pin of an optical sub-assembly. The dual-purpose pin is used to propagate an analog signal out of the optical sub-assembly and also for providing an access point where an external element may be coupled to the optical sub-assembly for modulating the analog signal. The optical sub-assembly houses a photodetector, a signal transmitter circuit, and a signal receiver circuit. The photodetector receives light and generates a corresponding electrical signal indicative of the light intensity. The signal transmitter circuit converts the electrical signal received from the photodetector into the analog signal that is transmitted out of the dual-purpose pin. The signal receiver circuit located inside the optical sub-assembly is configured to monitor the modulated analog signal present at the dual-purpose pin and generate therefrom, a control signal inside the optical sub-assembly.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several figures.

DETAILED DESCRIPTION

Figure 1:
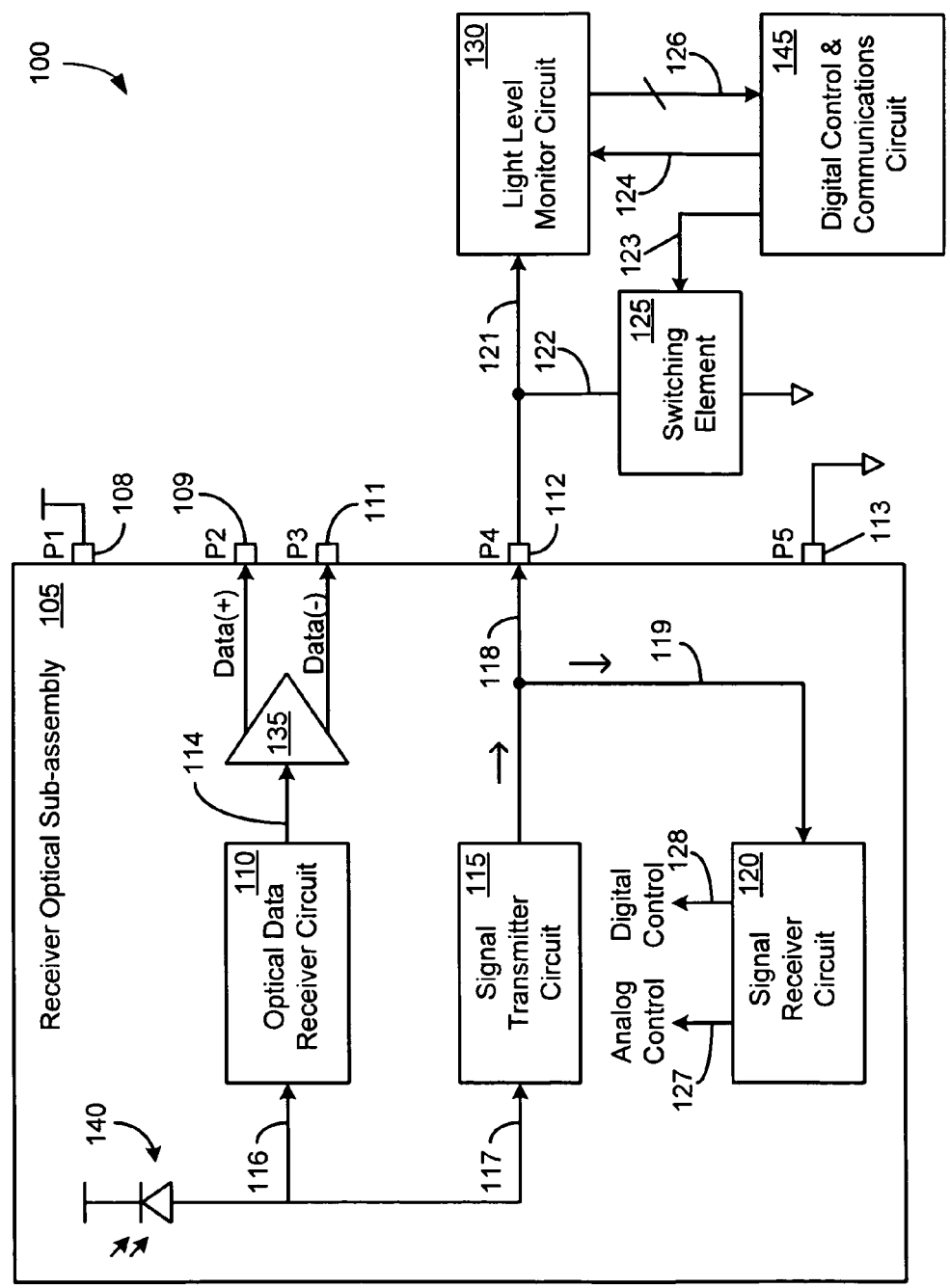
FIG. 1 illustrates an exemplary embodiment in accordance with the invention of a signal transmission system implemented in a receiver optical sub-assembly (ROSA) that is coupled to a set of external components.

The various embodiments generally pertain to systems and methods related to using a dual-purpose pin of a pin-limited package for implementing a bi-directional signal transmission system. Unlike a conventional input/output (I/O) pin that supports bi-directional signal transmission by incorporating control logic to tri-state a driver device when a receiver device is active, a dual-purpose pin in accordance with the invention is operable as an output pin for transmitting a first signal out of a pin-limited package while simultaneously operable as an input pin that is accessible by circuitry located external to the pin-limited package for purposes of generating a second signal (a control signal, for example) inside the pin-limited package. This operation is carried out by using one or more elements of the externally-located circuitry to modulate the first signal while the first signal is being transmitted out of the pin-limited package. The modulated first signal is coupled to a receiver circuit located inside the pin-limited package. The receiver circuit uses the modulated first signal to generate the second signal (a digital control signal, for example) that is then used inside the pin-limited package.

While the text below refers to certain 5-pin optical sub-assemblies such as a receiver optical sub-assembly (ROSA) and a transmitter optical sub-assembly (TOSA), it will be understood that these sub-assemblies have been used solely for purposes of description. Therefore, other embodiments in accordance with the invention may be implemented in a variety of devices and circuits and in a variety of electrical and/or electro-optical packages. Some exemplary packages include: integrated circuits, electronic modules, and opto-electronic modules. Furthermore, in one embodiment in accordance with the invention, the bi-directional signal transmission system may be implemented upon a discrete circuit with a link/track/wire in the circuit used in an equivalent manner to the dual-purpose pin described below.

It will be also understood that various terms used below are solely for purpose of description and should not be interpreted in a narrow sense. For example, a person of ordinary skill in the art will recognize that the term "link" as used below may be implemented using various hardware elements as well as a variety of transmission methodologies. A non-exhaustive list of exemplary hardware elements includes: a wire, a PCB track, an optical fiber, and a wireless connection. A person of ordinary skill in the art will also recognize that the term "link" is being used herein for ease of description even when several links are coupled together and constitute the same electrical "voltage node."

Furthermore, the term "exemplary" as used herein is indicative of one example amongst several examples and is not intended to be interpreted as being necessarily the only "ideal" or "preferred" example (although in certain cases the described example may indeed be the preferred example).

FIG. 1 illustrates a first exemplary embodiment in accordance with the invention of a bi-directional signal transmission system 100 implemented in a 5-pin receiver optical sub-assembly (ROSA) 105. ROSA 105 is one example of a pin limited package in which it is advantageous to incorporate a bi-directional signal transmission system using a dual-purpose pin. Pin P1 108 of ROSA 105 is connected to a positive voltage source, pin P5 113 is connected to ground, pins P2 109 and P3 111 are output pins that output a differential signal generated inside ROSA 105, and pin P4 112 is a dual-purpose pin which will be described below in further detail. It will be understood that in alternative embodiments, power supply pins P1 108 and P5 113 may be connected to voltages of various amplitudes and polarities as is known in the art.

ROSA 105 contains a photodetector 140 that is configured to receive light coupled into ROSA 105. The received light, which typically carries a communication data stream, is fed into ROSA 105 via an optical fiber coupled to a connector (not shown) of ROSA 105. Photodetector 140 converts the received light into an electrical signal that is transported over link 116 into an optical data receiver circuit 110. Optical data receiver circuit 110 typically includes circuitry (not shown) such as a transimpedance amplifier and a threshold detector for converting the signal received via link 116 into a digital data stream that is coupled via link 114 into a differential driver 135. Differential driver 135 converts the digital data stream received via link 114 into a differential signal that is transmitted out of ROSA 105 via pins P2 109 and P3 111.

The electrical signal generated by photodetector 140 is further transported over link 117 into a signal transmitter circuit 115 that incorporates signal conditioning and conversion circuits (not shown) such as a transimpedance amplifier and a line driver. The transimpedance amplifier converts the detector current provided by photodetector 140 into a voltage signal that varies in accordance with the average amplitude of the detector current. Typically, this variation corresponds to a digital communications signal carried in the light that is incident upon photodetector 140.

Signal transmitter circuit 115 converts the detector current (received via link 117), into an analog output voltage signal (or an analog output current signal) that is driven by the line driver (not shown) into link 118 and out of dual-purpose pin P4 112. While signal transmitter circuit 115 is coupled to dual-purpose pin P4 112 in this manner, signal receiver circuit 120 is also coupled to dual-purpose pin P4 112 via a link 119 that operates as a branch of link 118. Signal receiver circuit 120 monitors dual-purpose pin P4 112 for detecting the presence of a modulated analog signal (described below in more detail) that is interpreted for generating various types of signals used internal to ROSA 105. A non-exhaustive list of such internal signals includes an analog control signal provided via link 127 and a digital control signal provided via link 128.

Turning now to components located external to ROSA 105, a light level monitor circuit 130 is connected to dual-purpose pin P4 112. Light level monitor circuit 130 is configured to receive via link 121, the analog output voltage signal driven by signal transmitter circuit 115 out of dual-purpose pin P4 112, and monitor the low frequency variations in the analog output voltage signal. In one exemplary embodiment, the monitored amplitude variations are converted into a digital format and transported over a bus 126 into a digital control and communications circuit 145 where the data can be used for monitoring the average level of light received in photodetector 140. Digital control and communications circuit 145 also provides a control signal via link 124 to light level monitor circuit 130. This control signal, as well as certain components located inside light level monitor circuit 130, will be described below in further detail using FIG. 2.

Switching element 125 is connected via link 122 to dual-purpose pin P4 112. Switching element 125 is operable to pull down the analog output voltage signal present on link 121 to a ground potential at certain selected instances in time. This grounding action results in the creation of a logic low level at desired times, thereby producing a modulation effect upon the analog output voltage signal present at dual-purpose pin P4 112. Signal receiver circuit 120 monitors, via link 119, the modulated analog signal present at dual-purpose pin P4 112. Digital control and communications circuit 145 provides a control signal carried over link 123 for controlling the switch so as to create the desired modulated analog signal. Further details are provided below using FIG. 8.

Figure 2:
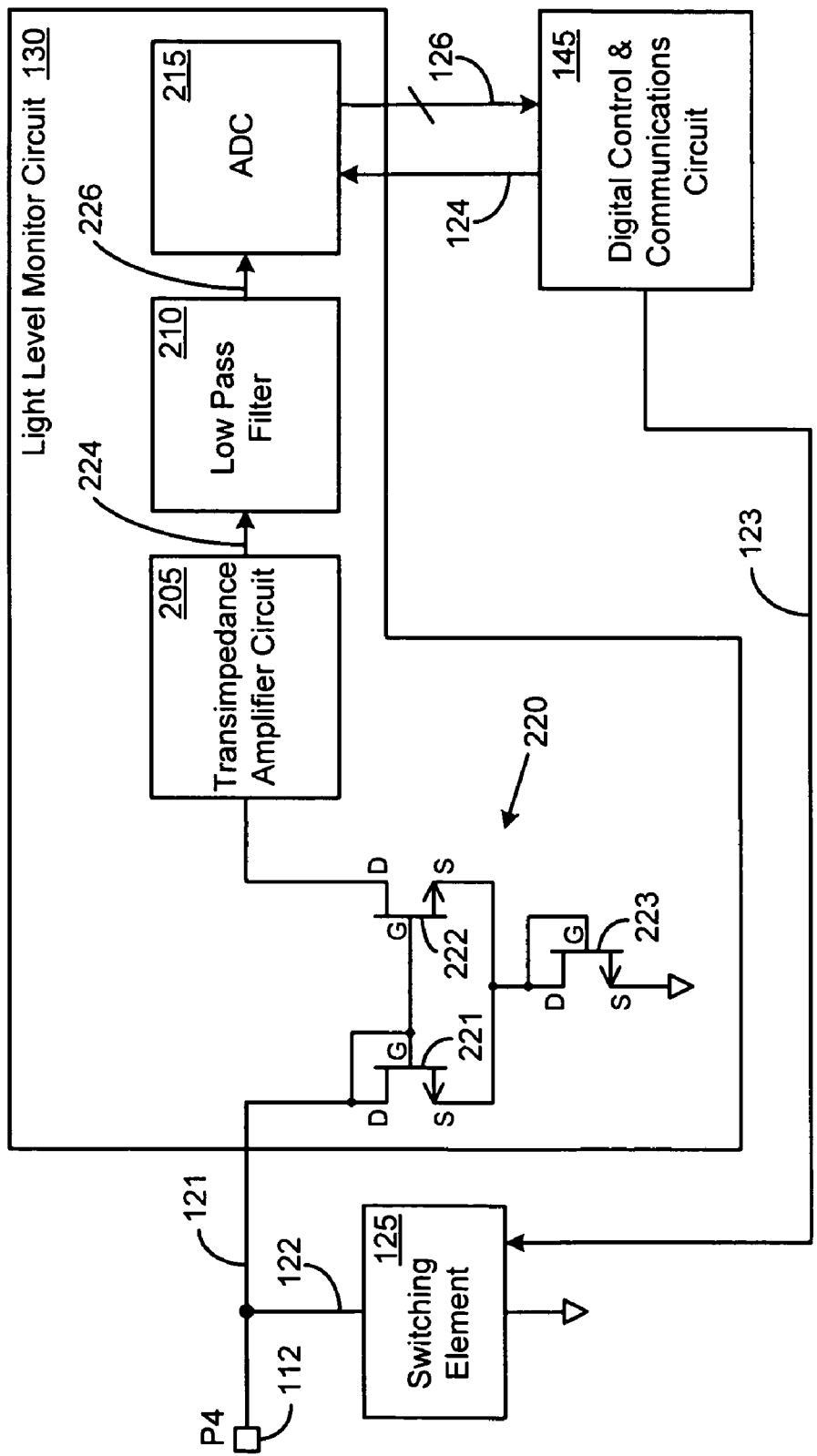
FIG. 2 illustrates a few details of the external components of FIG. 1.

FIG. 2 illustrates switching element 125 as well as light level monitor circuit 130. A few exemplary components that are located inside light level monitor circuit 130 are also shown and will be described below in further detail. In this exemplary embodiment, signal transmitter circuit 115 (shown in FIG. 1) transmits an analog current output signal out of ROSA 105 through dual-purpose pin P4 112. The analog current output signal is transported from dual-purpose pin P4 112 via link 121 into a current mirror circuit 220 that is a part of light level monitor circuit 130. Current mirror circuit 220 can be configured in several alternative ways. In the exemplary embodiment shown in FIG. 2, a first FET 221 has a gate terminal connected to a drain terminal with a source terminal connected to a second FET 223 that is configured as a diode level shifter. Current mirror circuit 220 further includes a third FET 222 that is coupled to first FET 221 and second FET 223 in the manner shown, such that a drain-source current flow in first FET 221 results in a mirror drain-source current flow in third FET 222. The mirrored drain-source current flow in third FET 222 is coupled into a transimpedance amplifier circuit 205 which converts this current into a corresponding monitor voltage. The monitor voltage is coupled via link 224 to a low pass filter (LPF) 210 for noise filtering, and further coupled via link 226 into analog-to-digital converter (ADC) 215.

ADC 215 converts the monitor voltage received from LPF 210 into a digital data stream that is transmitted to digital control and communications circuit 145 for further processing. Digital control and communications circuit 145 which, in one embodiment, incorporates a processing device such as a microcontroller, decodes the data contained in the digital data stream for obtaining power level information (light level monitoring) of the light incident upon photodetector 140.

In this exemplary embodiment, switching element 125 is operable to couple to a ground potential, at certain selected intervals of time, the analog current output signal flowing through link 121 from dual-purpose pin P4 112. This modulates the voltage present at dual-purpose pin P4 112 between a voltage level generated by the current flowing through current mirror circuit 220 and a logic low level (close to ground potential). The selective coupling to ground is controlled via the signal provided by digital control and communications circuit 145 over link 123.

Figure 3:
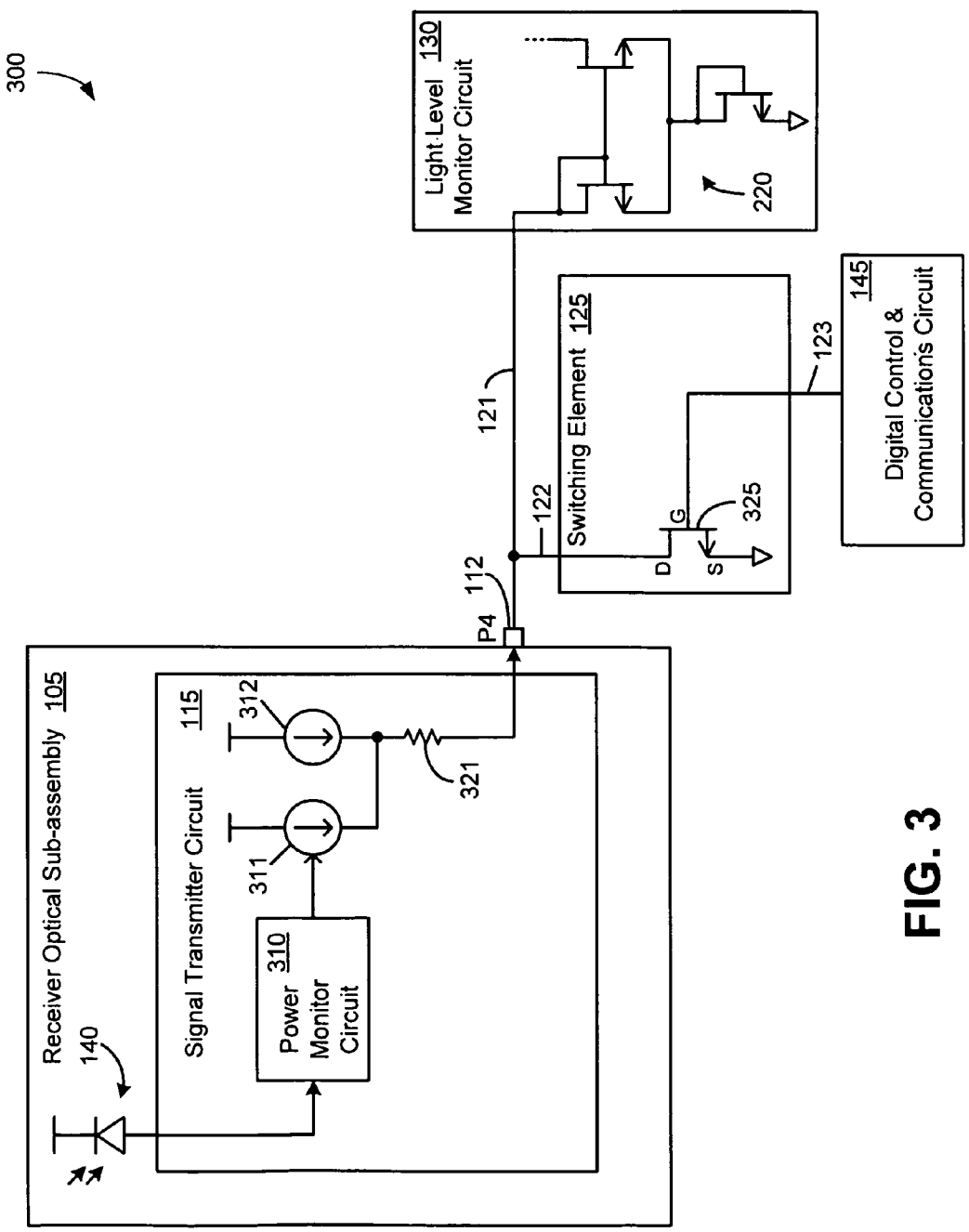
FIG. 3 illustrates an exemplary embodiment in accordance with the invention wherein a ROSA is configured to propagate an analog current output signal out of a dual-purpose pin of the ROSA.

FIG. 3 illustrates an exemplary embodiment in accordance with the invention of a bi-directional signal transmission system 300 implemented in ROSA 105 configured to propagate an analog current output signal out of dual-purpose pin P4 112. In this embodiment, signal transmitter circuit 115 contains a power monitor circuit 310 coupled to a first current source 311.

Power monitor circuit 310 incorporates a current buffer/driver that receives the detector current from photodetector 140 and propagates a drive current (with an appropriate current gain) to first current source 311. In this case, current source 311 may be implemented in a variety of ways. For example, a current mirror circuit may be used with one leg of the current mirror configured to receive the amplified drive current from power monitor circuit 310, with a mirrored current flow in a second leg being used for propagating the analog current output signal out of dual-purpose pin P4 112.

Furthermore, in the exemplary embodiment shown in FIG. 3, single-wire transmitter circuit 115 includes a second current source 312 that is connected in parallel to first current source 311. The parallel connection permits current from either first current source 311 or second current source 312 to flow through a resistor 321 (which is an optional element) to dual-purpose pin P4 112. Second current source 312 is configured to provide a constant current flow through resistor 321. This constant current flow constitutes a quiescent current that is superimposed on any current generated by first current source 311. Second current source 312 may be omitted in certain embodiments.

As can be understood, the current from first current source 311 drops to a negligible (substantially zero) value when photodetector 140 produces no detector current (which typically occurs when no light is incident upon photodetector 140). Consequently, the quiescent current provided by second current source 312 constitutes the sole current when no light is incident upon photodetector 140. The amplitude of this quiescent current is set so as to provide a desired minimum value of voltage across current mirror 220. The presence of the drain-to-source quiescent current places current mirror 220 in a suitable bias condition to permit switching operations to be carried out even when there is no light incident upon photodetector 140. The switching operations are carried out for generating a modulated signal on link 121 (shown in FIG. 1). The modulated signal is used by signal receiver circuit 120 (shown in FIG. 1) to generate one or more control signals without depending solely on light being present upon photodetector 140.

FET 325 of switching element 125 may be turned on or off under control of a control signal carried on link 123 from the digital control and communications circuit 145. The control signal activates FET 325 in such a manner that the voltage present on link 121 is coupled to ground at selected instances in time. This selective coupling to ground constitutes a modulation process that is described below in further detail using FIGS. 7 and 8. FET 325 may be replaced by other types of switching elements in alternative implementations.

Switching element 125, light level monitoring circuit 130, and digital control and communications circuit 145, wholly or partially, may be packaged inside a second electrical subassembly or fully incorporated into an integrated circuit that is an independent package outside ROSA 105.

Figure 4:
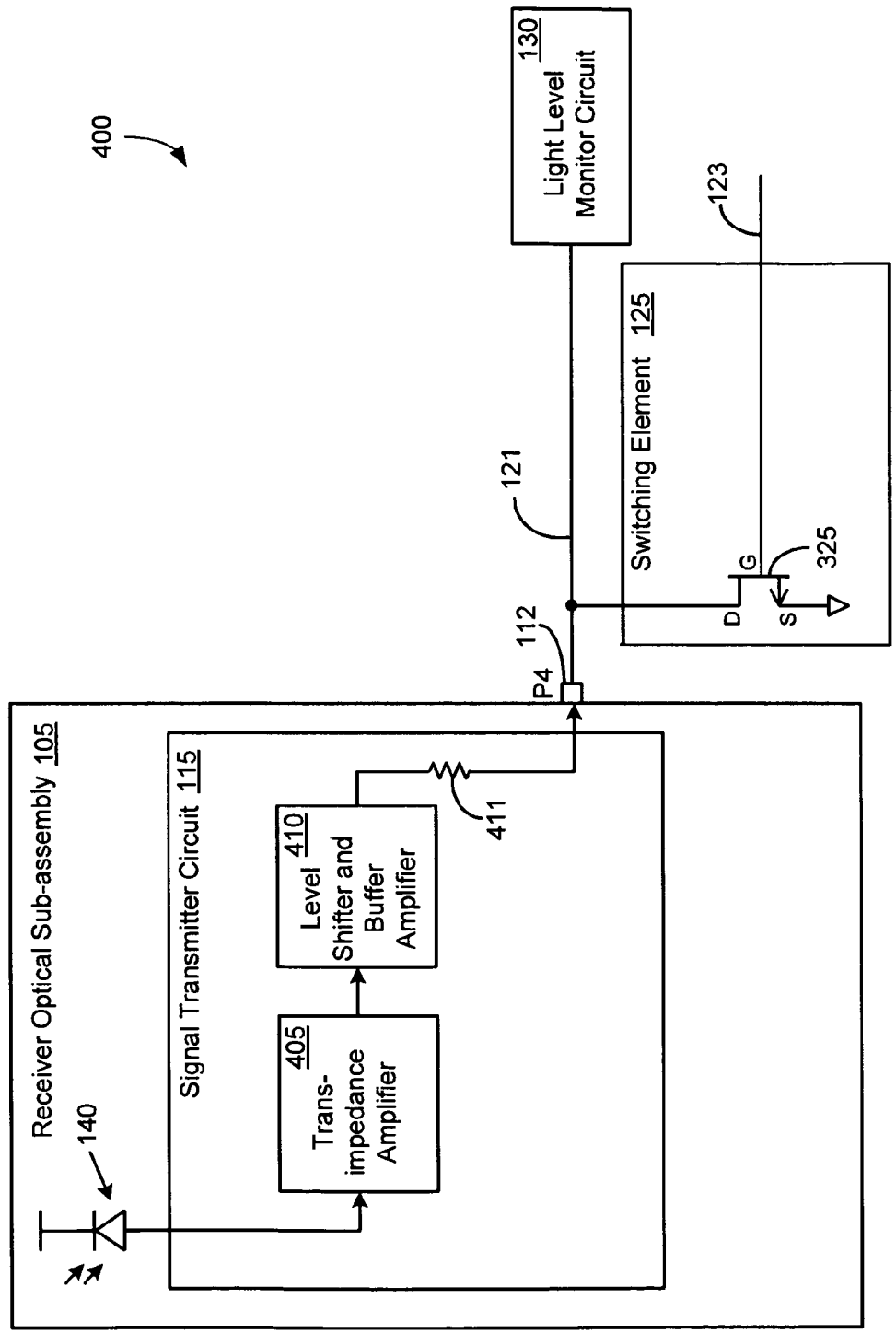
FIG. 4 illustrates an exemplary embodiment in accordance with the invention wherein a ROSA is configured to provide an analog voltage output signal out of a dual-purpose pin of the ROSA.

FIG. 4 illustrates an exemplary embodiment in accordance with the invention of a bi-directional signal transmission system 400 wherein ROSA 105 is configured to provide an analog voltage output signal out of dual-purpose pin P4 112. This embodiment is in contrast to the embodiment described above using FIG. 3 where an analog current output signal (instead of an analog voltage output signal) is propagated out of dual-purpose pin P4 112.

Signal transmitter circuit 115 contains a transimpedance amplifier 405 for converting the detector current provided by photodetector 140 into a corresponding detector voltage, using a suitable gain/amplification factor. The detector voltage is fed into a level shifter and buffer amplifier 410 where the level shifter adds an offset voltage to the detector voltage in generating the analog voltage output signal that is provided to dual-purpose pin P4 112 via a buffer amplifier and resistor 411. The offset voltage constitutes a quiescent voltage that is a consistently present minimum voltage ($V_{min}$) at dual-purpose pin P4 112 even when there is no light incident upon photodetector 140. $V_{min}$ may be alternatively referred to as a quiescent voltage. Resistor 411 operates as a pull-up resistor connected to the drain terminal of FET 325 for use in modulating the voltage present at dual-purpose pin P4 112.

Figure 5:
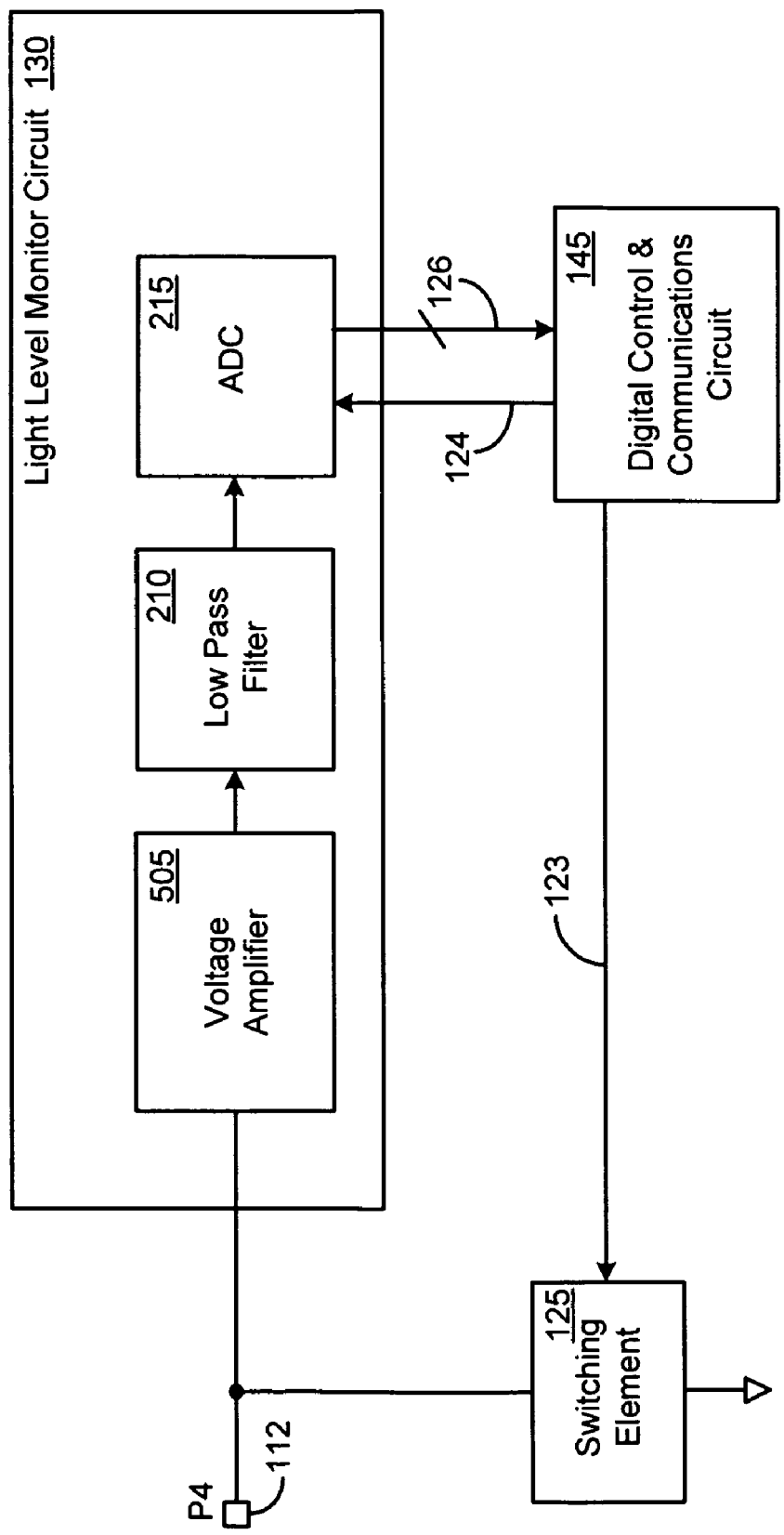
FIG. 5 illustrates certain circuit details associated with the exemplary embodiment shown in FIG. 4.

FIG. 5 illustrates certain circuit details of light level monitor circuit 130 which is a component of bi-directional signal transmission system 400 shown in FIG. 4. Unlike the embodiment shown in FIG. 2 where light level monitor circuit 130 is configured to receive an analog current output signal from dual-purpose pin P4 112, the light level monitor circuit 130 shown in FIG. 5 is configured to receive an analog voltage signal from dual-purpose pin P4 112. The analog voltage output signal from dual-purpose pin P4 112 is fed into a voltage amplifier (or a voltage buffer) 505 from where it is coupled into LPF 210 and ADC 215. LPF 210 and ADC 215 are operated in a manner similar to that described above.

Figure 6:
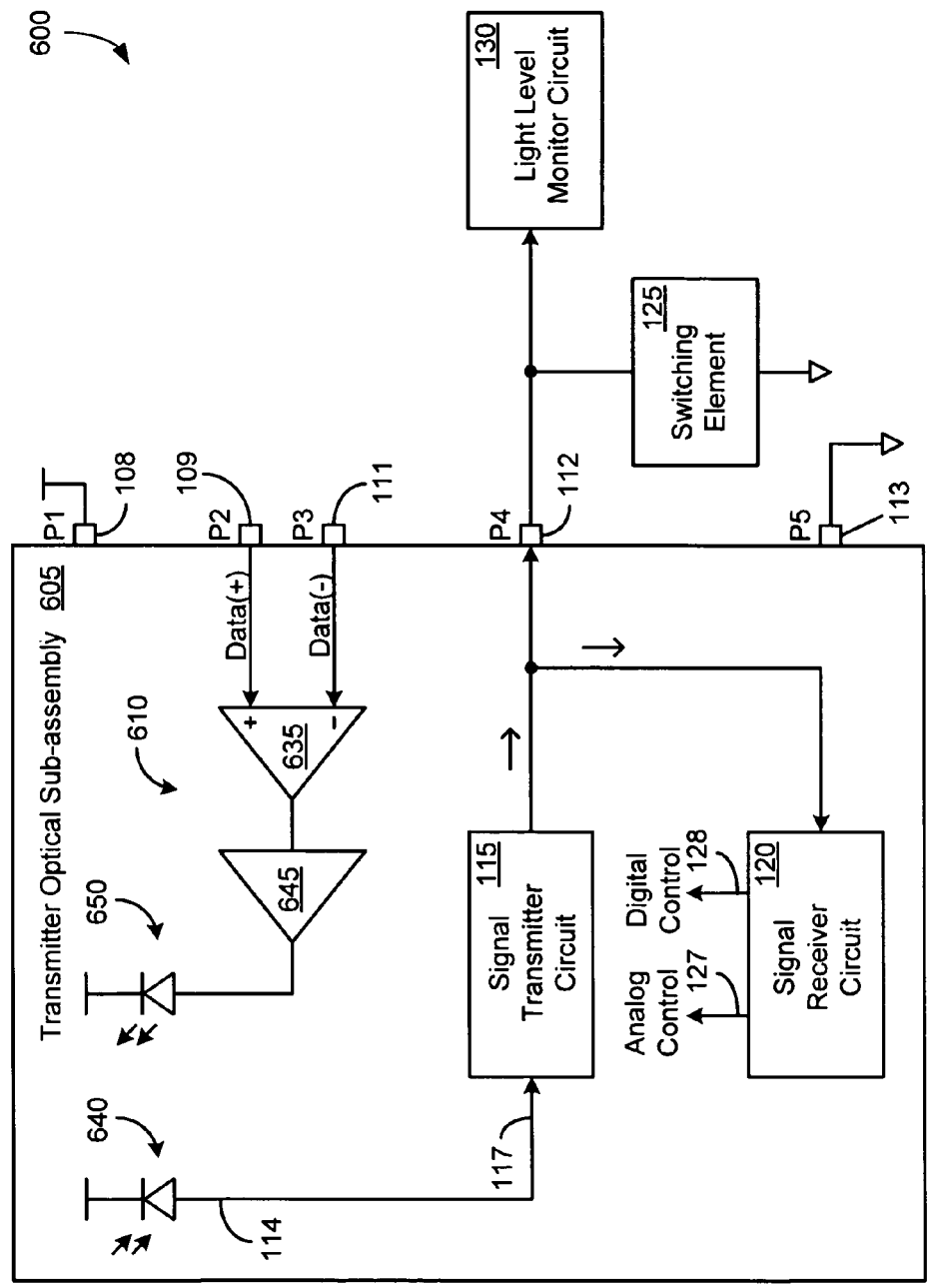
FIG. 6 illustrates an exemplary embodiment in accordance with the invention of a signal transmission system implemented in a transmitter optical sub-assembly (TOSA) coupled to a set of external components.

FIG. 6 illustrates an exemplary embodiment in accordance with the invention of a bi-directional signal transmission system 600 implemented in a 5-pin transmitter optical sub-assembly (TOSA) 605. In contrast to ROSA 105 which contains an optical data receiver circuit 110 (shown in FIG. 1), TOSA 605 includes an optical data transmitter circuit 610. In one exemplary embodiment, optical data transmitter circuit 610 is implemented using a differential buffer 635, a driver 645, and a light emitting device 650. Differential buffer 635 is configured to receive a differential data signal stream that is fed into TOSA 605 via pins P2 109 and P3 111. The differential data signal stream is converted into a single-ended data stream by differential buffer 635 and coupled into driver 645 from where it is used to drive light emitting device 650. In a first exemplary embodiment, light emitting device 650 is a laser, while in a second exemplary embodiment light emitting device 650 is a light emitting diode (LED). Unlike traditional implementations where a driver, especially a laser driver, is located outside a package (typically due to restricted pin availability which prevents desired control signals from being fed into the package for controlling the driver device), driver 645 is embedded inside the 5-pin package implementation of TOSA 605 in accordance with the invention. Signal transmitter circuit 115 and signal receiver circuit 120 of TOSA 605 operate in a manner similar to signal transmitter circuit 115 and signal receiver circuit 120 of ROSA 105 described above.

In one exemplary embodiment, TOSA 605 is a transmitter device with photodetector 640 operating as a monitoring device for measuring light transmitted by light emitting device 650 out of the TOSA 605. When configured in this manner, photodetector 640 generates a detected monitor current that is proportional to the signal strength of the light emitted by light emitting device 650.

Figure 7:
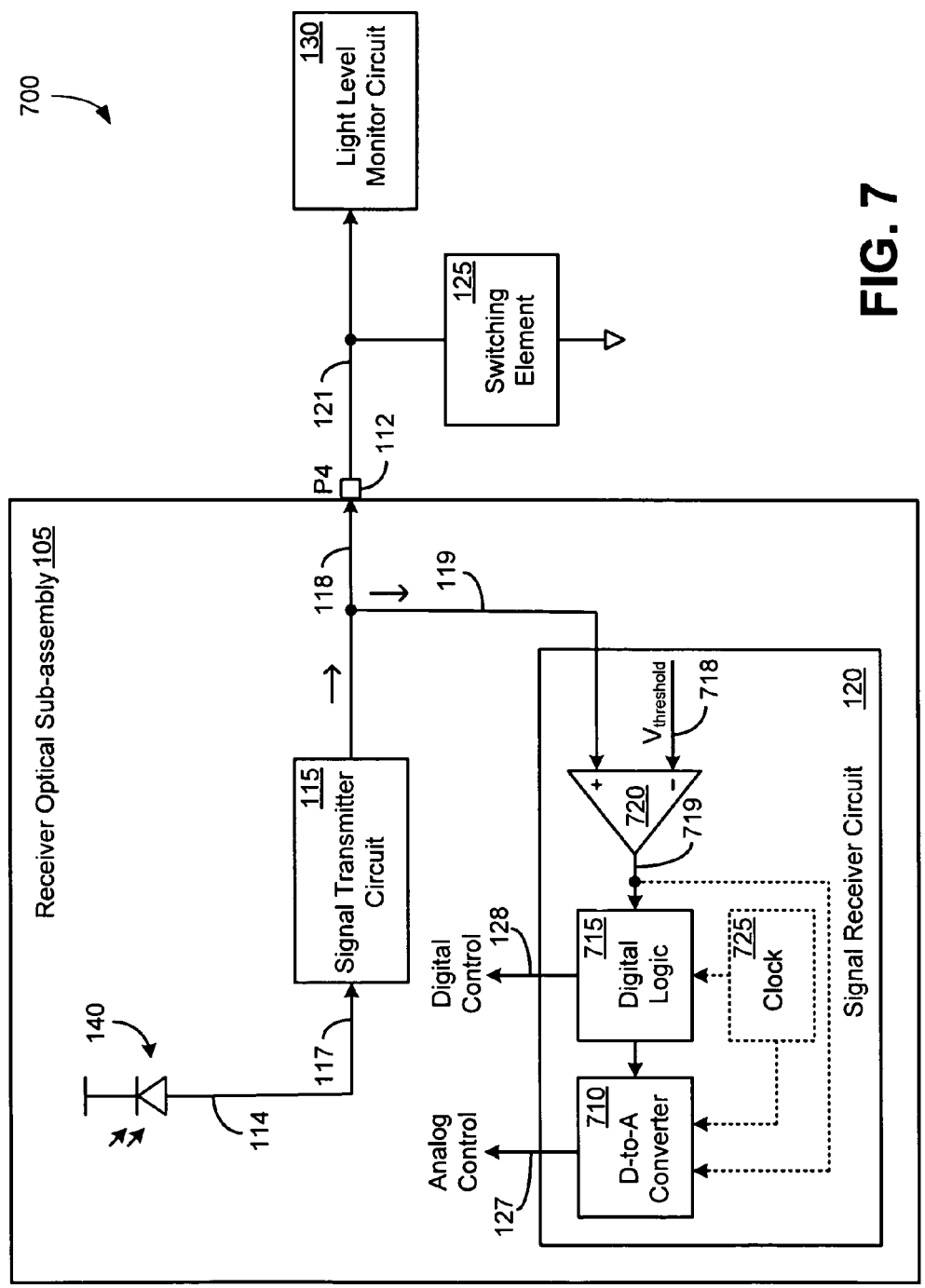
FIG. 7 illustrates certain circuit details of an exemplary signal receiver circuit of the signal transmission system.

Attention is now drawn to FIG. 7, which illustrates an exemplary circuit implementing a signal receiver circuit 120 in accordance with the invention. In this exemplary implementation, signal receiver circuit 120 is located inside ROSA 105 (or alternatively inside TOSA 605), and includes a threshold detector 720. Link 718 provides a threshold voltage ($V_{threshold}$) with an amplitude that is selected based on the quiescent voltage (or quiescent current level) described above. The threshold selection is described below in further detail using FIG. 8. The modulated analog signal created at dual-purpose pin P4 112 (using switching element 125) is monitored by threshold detector 720 wherein it is compared against the threshold voltage. The output from threshold detector resulting from this comparison is a digital signal. The voltage levels of this digital signal may be suitably selected based on the type of operational logic (typically rail-to-rail CMOS) desired inside ROSA 105.

The digital signal generated by threshold detector 720 is coupled via link 719 into digital logic 715. Digital logic 715 incorporates various types of logic devices such as registers, gates, memory devices etc. and may be implemented using various types of circuitry. In one embodiment, digital logic 715 includes storage registers configured to store the data carried in the digital signal. Some examples of storage registers include, but are not limited to, a shift register, a volatile memory (e.g. SRAM), and a non-volatile memory (e.g. Flash memory).

The digital data stored/processed in digital logic 715 is used in one embodiment to generate a digital control signal that is propagated via link 128 to various components inside ROSA 105 for carrying out various control functions. Digital logic 715 may also further provide digital data that is coupled into digital-to-analog converter (DAC) 710. DAC 710 converts this digital data stream into an analog control signal that is propagated via link 127 to various components inside ROSA 105. A few exemplary uses for this analog control signal include: gain control, setting a laser drive current, setting bias, setting a modulation level, setting a desired bandwidth.

Clock 725 is an optional component that is used in some exemplary embodiments wherein synchronous logic operation is desired. In such embodiments, suitable clock signals are provided from local clock 725 into various components such as DAC 710 and digital logic 715.

In a further exemplary embodiment, digital logic 715 contains a bank of registers configured to store multiple sets of digital data bits decoded from the digital signal on link 719. The multiple sets of digital data bits are written into the bank of registers in a manner that allows implementation of a majority voting scheme wherein multiple sets of supposedly-identical data bits are compared against each other to determine valid data bits. For example, three sets of digital data bits are compared against each other and if a particular bit in a particular bit position has a High logic value in two of the sets and a Low logic value in the third set, a determination is made based on a best-of-three majority vote that this particular data bit should be interpreted as having a High logic value.

Figure 8:
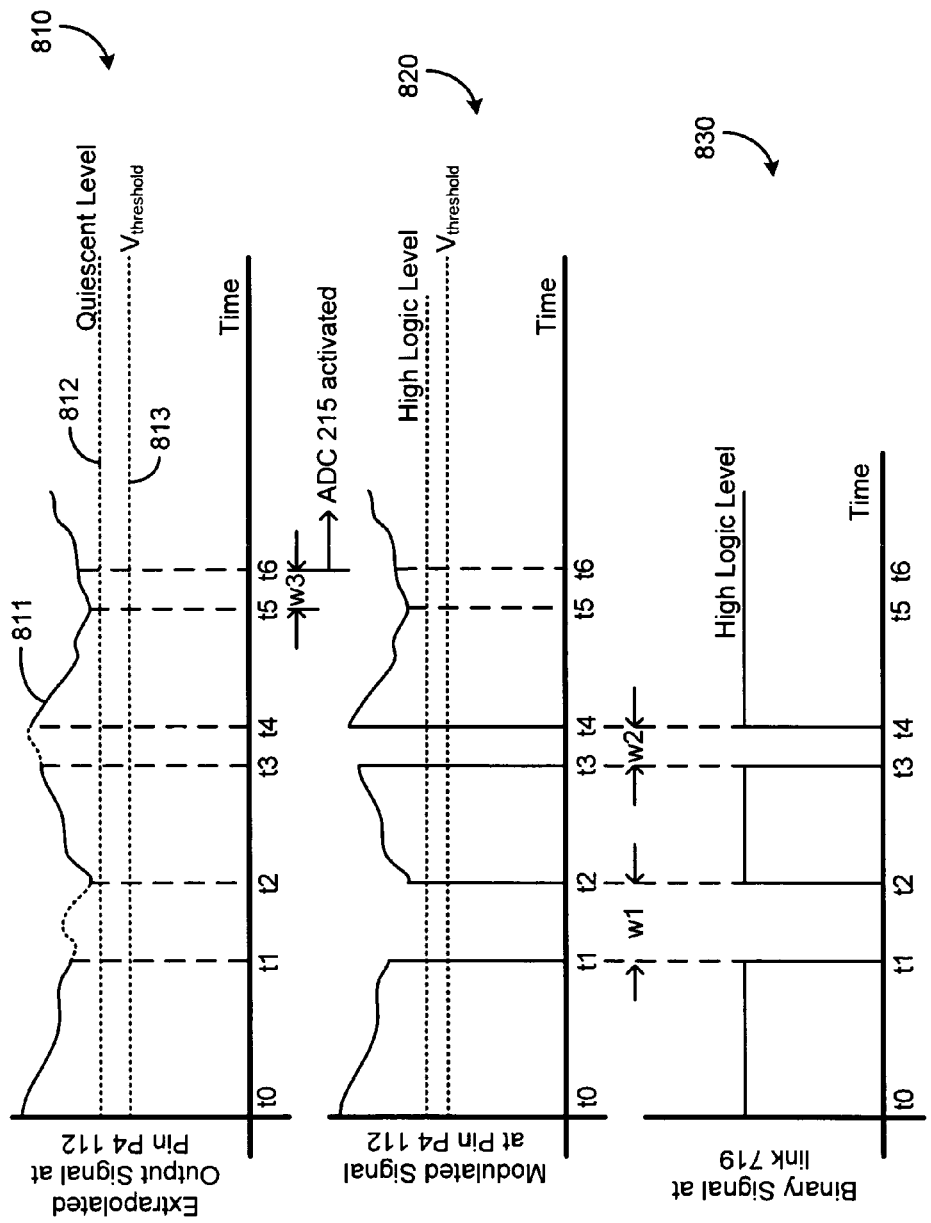
FIG. 8 illustrates a set of waveforms that illustrate operation of a signal transmission system in accordance with the invention.

FIG. 8 illustrates a set of waveforms that illustrate operation of a bi-directional signal transmission system in accordance with the invention. The waveforms shown in FIG. 8 will be described using the exemplary embodiment of FIG. 7 as well as other figures. Waveform 810 shows amplitude variations 811 of the analog voltage output at dual-purpose pin P4 112. Amplitude variations 811 are superimposed upon quiescent voltage level 812, which is selected to be greater than threshold voltage ($V_{threshold}$) present on link 718 of FIG. 7.

For current-oriented implementations (as described above using FIG. 3), amplitude variations 811 are variations in current that are superimposed upon quiescent current $I_{DS\_quiescent}$ (provided by second current source 312 shown in FIG. 3). Quiescent current $I_{DS\_quiescent}$ is selected such that the resulting quiescent voltage level across current mirror 220 is greater than or equal to a High logic level, which is higher than the threshold voltage $V_{threshold}$.

The dashed portions of amplitude variations 811 (between t1-t2 and t3-t4) represent a graphical extrapolation of the amplitude variations in the absence of any modulation being applied to the analog voltage output present at dual-purpose pin P4 112.

Waveform 820 shows amplitude variations 811 of the analog voltage output when modulation is applied to the analog voltage output present at dual-purpose pin P4 112. As described above (using FIGS. 3 and 4), the modulation is applied using switching element 125 under control of digital control and communications circuit 145.

From time t0 to time t1, FET 325 is placed in an "off" state. When the bi-directional signal transmission system is implemented using the analog voltage output circuit described using FIG. 4, the "off" state is characterized by negligible conduction in FET 325.

At time t1, the control signal carried over link 123 is provided to FET 325 for placing FET 325 in a fully conduction state (switch state "on"). Under this condition, irrespective of the type of implementation, the drain terminal of FET 325 is pulled down to a potential that corresponds to a Low logic level.

The Low logic level is maintained until time t2, when the control signal provided over link 123 is suitably changed such that FET 325 is placed in the "off" state once again. Subsequently, in a manner similar to the process described above for times t1 and t2, FET 325 is turned on and then off at times t3 and t4 respectively. As can be seen in FIG. 8, the period of time between t1 and t2 is represented by a first time period "w1", while that between t3 and t4 is represented by a second time period "w2." The first and second time periods (and subsequent such time periods that are not shown) are selected based on a desired encoding scheme.

Waveform 820, which is present at dual-purpose pin P4 112 when modulation is carried out, is monitored by threshold detector 720. Threshold detector 720 uses the $V_{threshold}$ reference voltage provided on link 718 to carry out threshold detection for generating the digital signal 830 that is output on link 719. As can be understood, digital signal 830 can be generated even when amplitude variations 811 is not present, because of the presence of quiescent voltage level 812. Consequently, control information can be propagated into ROSA 105 (or TOSA 605) via modulation of dual-purpose pin P4 112, even when no light is incident upon photodetector 140.

At time t5, the modulation process described above is discontinued, thereby terminating propagation of the control information into ROSA 105 via dual-purpose pin P4 112. During the time period t0-t5, the operation of ADC 215 (FIGS. 2 and 5) is inhibited as a result of a disable signal that is propagated via link 124 from digital control and communications circuit 145 to ADC 215. This action is carried out so as to prevent corrupt conversion data (as a result of ADC conversion upon the modulated signal rather than upon a valid monitor signal carrying light level information) from being transferred from ADC 215 to digital control and communications circuit 145 over bus 126. In an alternative embodiment, rather than disabling ADC 215, the corrupt conversion data is transmitted over bus 126. However, this corrupted data is disregarded by digital control and communications circuit 145, by using for example a disable/ignore control signal in digital control and communications circuit 145.

After time t5, when the modulation process has been stopped, a settling period w3 may be introduced if necessary before ADC 215 is enabled once again at time t6. ADC 215 may be enabled by removing the disable signal carried over link 124 from digital control and communications circuit 145. Settling period w3 allows the analog voltage present at dual-purpose pin P4 112, and LPF 210 to settle so that corrupted data is not decoded. In one exemplary embodiment, waiting period w3 is selected to be greater than the settling time period for one or more components in either ROSA 105 and/or in light level monitor circuit 130. Some exemplary components include transimpedance amplifier 405 (shown in FIG. 4), power monitor circuit 310 (shown in FIG. 3) and low pass filter 210 (shown in FIG. 5).

It will be understood that multiple encoding schemes including PWM (pulse width modulation) may be used in accordance with the invention. In various alternative embodiments, other modulation techniques may be applied. It will be further understood that the modulation techniques may be also implemented using a variety of control and communication formats and is not restricted to any one particular protocol.

Figure 9:
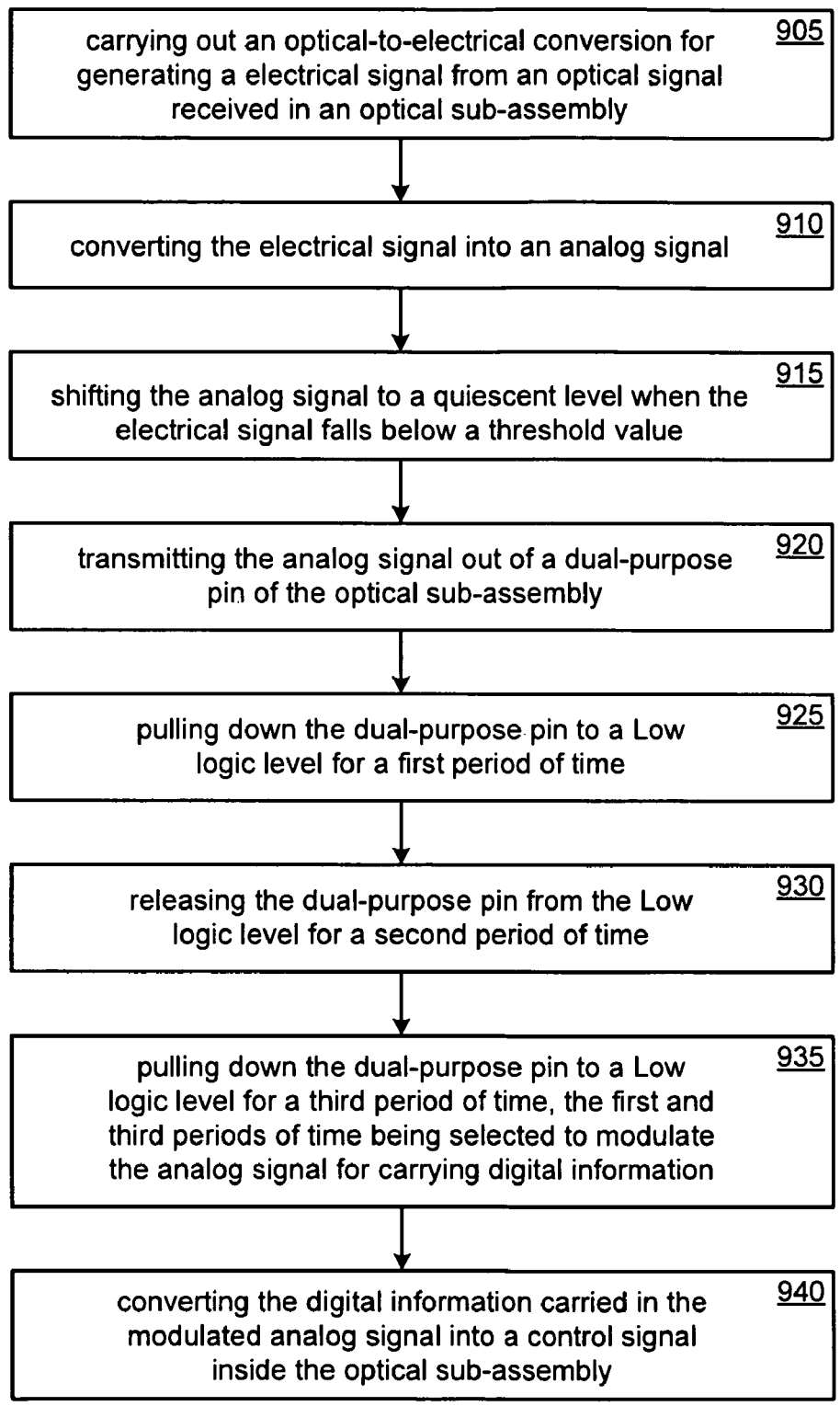
FIG. 9 illustrates a flowchart for a method of operating a signal transmission system in accordance with the invention.

FIG. 9 illustrates a flowchart for a method of operating a bi-directional signal transmission system in accordance with the invention. Although the flowchart is shown with particular steps in a certain sequence, it will be understood that steps may be executed out of order from that shown or discussed, including substantially concurrent or in reverse order, and one or more steps may be optionally omitted.

In block 905, an optical-to-electrical (O/E) conversion is carried out for generating an electrical signal received in an optical assembly. For example, such an O/E conversion is carried out using photodetector 140 or photodetector 640 described above. In block 915, the electrical signal is conditioned into an analog signal. This action is carried out in signal transmitter circuit 115 which, as shown in FIG. 3, converts the electrical signal received from photodetector 140 into an analog output current signal or, as shown in FIG. 4, converts the electrical signal into an analog output voltage signal.

In block 920, the analog signal is shifted to a quiescent level for overcoming handicaps associated with the electrical signal falling below a threshold value. Such handicaps include the inability to propagate a control signal into the optical sub-assembly when no light is present on the photodetector. The generation of a quiescent voltage (or quiescent current) is carried out in order to propagate control/communication information into ROSA 105 (or TOSA 605) via dual-purpose pin P4 112 even when no light is incident upon the photodetector 140. Details on this aspect have been provided above.

In block 925, a dual-purpose pin is pulled down to a low logic level for a first period of time. This corresponds to time period w1 described above using FIG. 8. In block 930, the dual-purpose pin is released for a second period of time. This corresponds to the time period after time t2 shown in FIG. 8.

In block 935, the dual-purpose pin is pulled down to a low logic level for a third period of time. This corresponds to time period w2 described above using FIG. 8. The duration of the first and third time periods (w1 and w2) are selected to modulate the analog signal in a PWM format for example.

In block 940, digital information carried in the analog signal is converted into a control signal inside the optical sub-assembly. In one exemplary embodiment, this action is carried out using circuitry contained in signal receiver circuit 120 shown in FIG. 7.

Figure 10:
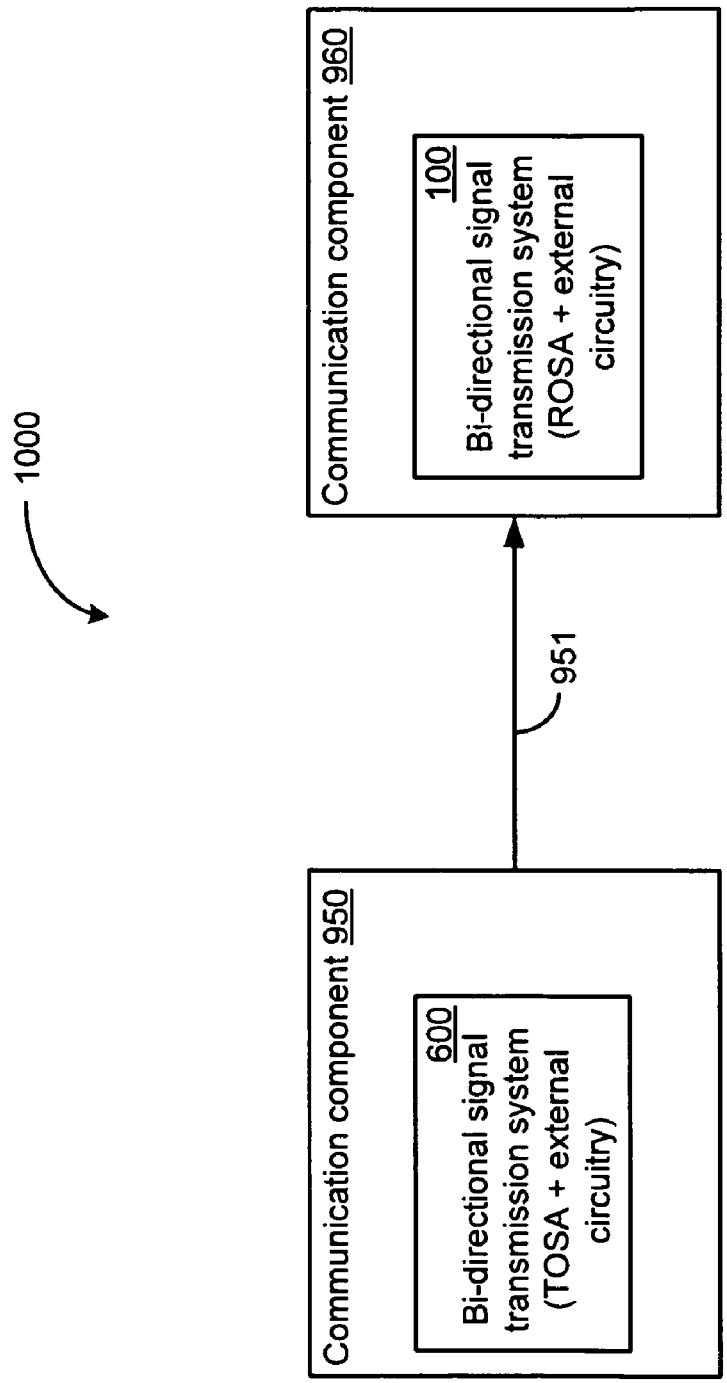
FIG. 10 illustrates an exemplary communication system incorporating a ROSA and a TOSA.

FIG. 10 illustrates an exemplary communication system incorporating a first communications component 950 communicatively coupled to a second communications component 960 via a communications link 951. First communications component 950 contains a TOSA plus associated external components (as parts of bi-directional signal transmission system 600 described above). Second communications component 960 contains a ROSA plus associated external components (as parts of bi-directional signal transmission system 100 described above). Either one of the communications components 950 or 960 is a pictorial representation of various types of communication equipment. A non-exhaustive list includes a signal transmitter unit, a signal receiver unit, a transceiver unit, a packet switcher, a router, and a gateway.

Communication link 951 may be implemented in a variety of ways. A non-exhaustive list includes a wired link, a wireless link, and an optical link. It will be also understood that communication link 951 may be a bi-directional link in certain embodiments, and in certain other embodiments may be implemented in the form of a network link incorporating various communication components (routers, switches, etc.) such as those used in a local area network (LAN) or a wide area network (e.g. the Internet).

The above-described embodiments are merely set forth for a clear understanding of the principles of the disclosure. Many variations and modifications may be made without departing substantially from the disclosure. All such modifications and variations are included herein within the scope of this disclosure.

We claim:

1. A signal transmission system incorporating an optical sub-assembly, the optical sub-assembly comprising:
    a dual-purpose pin for propagating an analog signal out of the optical subassembly and for providing an access point whereby an external element may be coupled to the optical sub-assembly for modulating the analog signal, the modulated analog signal being used thereon to generate a control signal inside the optical sub-assembly;
    a photodetector configured to receive light and generate therefrom, a first electrical signal indicative of an intensity of the received light;
    a signal transmitter circuit coupled to the photodetector and configured to convert the first electrical signal into the analog signal that is transmitted out of the dual-purpose pin;
    a signal receiver circuit configured to monitor the modulated analog signal present at the dual-purpose pin and generate therefrom, the control signal inside the optical sub-assembly; and
    wherein the analog signal is a current output signal, wherein the signal transmitter circuit is configured to maintain the current output signal at a quiescent current level when the first electrical signal falls below a threshold level, wherein the external element is a switching element located external to the optical sub-assembly, the switching element operable to generate the modulated analog signal by coupling the dual-purpose pin to a ground potential for a selected period of time whereby the analog signal is transitioned to a Low logic level for the selected period of time.

2. The signal transmission system of claim 1, wherein the optical sub-assembly is packaged as a five-pin package, wherein the pins of the five-pin package consist of the dual-purpose pin, a pair of power supply pins, and a pair of data signal pins.

3. The signal transmission system of claim 1, wherein the analog signal is a voltage output signal, and wherein the signal transmitter circuit is configured to maintain the voltage output signal at a quiescent voltage level when the first electrical signal falls below a threshold level.

4. The signal transmission system of claim 1, wherein the switching element is a field effect transistor (FET) and wherein the modulated analog signal is a pulse width modulated (PWM) signal.

5. The signal transmission system of claim 4, further comprising:
 a current mirror circuit located external to the optical sub-assembly, the current mirror circuit configured to receive the current output signal from the dual-purpose pin at a connection node in a first leg of the current mirror circuit and generate therefrom, a mirrored current in a second leg of the current mirror circuit, and wherein the PET is configured to pull down the analog signal to the Low logic level by coupling the connection node in the first leg of the current mirror circuit to the ground potential.

6. The signal transmission system of claim 5, wherein the optical sub-assembly is a) a receiver optical sub-assembly (ROSA) or b) a transmitter optical sub-assembly (TOSA).

7. The signal transmission system of claim 1, wherein the signal receiver circuit comprises:
 a threshold detector configured to monitor the modulated analog signal present at the dual-purpose pin and generate therefrom a digital signal comprising a High logic level corresponding to a period when the modulated analog signal exceeds a threshold voltage level; and
 a register coupled to the threshold detector, the register configured to store at least a portion of the digital signal provided by the threshold detector.

8. The signal transmission system of claim 1, wherein the signal receiver circuit further comprises:
 a threshold detector configured monitor the modulated analog signal present at the dual-purpose pin and generate therefrom a digital signal comprising a High logic level corresponding to a period when the modulated analog signal exceeds a threshold voltage level; and
 a digital-to-analog converter (DAC) for converting the digital signal generated by the threshold detector into an analog control signal that provides a control function inside the optical sub-assembly.

9. The signal transmission system of claim 1, comprising a communication component within which is incorporated the optical sub-assembly.

10. A signal transmission system incorporated into an optical sub-assembly, the optical sub-assembly comprising:
 a dual-purpose pin for propagating an analog signal out of the optical subassembly and for providing an access point whereby an external element may be coupled to the optical sub-assembly for modulating the analog signal, the modulated analog signal being used thereon to generate a control signal inside the optical sub-assembly;
 a photodetector configured to receive light and generate therefrom, a first electrical signal indicative of an intensity of the received light;
 a first current source configured to generate a current output signal that is directly proportional to the first electrical signal, the first current source further configured to drive the current output signal out of the dual-purpose pin; and
 a signal receiver circuit coupled to the dual-purpose pin, the signal receiver circuit configured to monitor the modulated analog signal present at the dual-purpose pin and generate therefrom, a digital signal, wherein the modulated version of the analog signal is generated by selectively pulling down the current output signal to a Low logic level by coupling the dual-purpose pin to a Low level voltage.

11. The signal transmission system of claim 10, further comprising a second current source coupled in parallel to the first current source, the second current source configured to maintain the current output signal at a quiescent current level when the first electrical signal falls below a threshold level.

12. The signal transmission system of claim 10, further comprising:
 a threshold detector configured to monitor the modulated analog signal present at the dual-purpose pin and generate therefrom a digital signal comprising a High logic level corresponding to a period when the modulated analog signal exceeds a threshold voltage level; and
 a digital-to-analog converter (DAC) for converting the digital signal generated by the threshold detector into an analog control signal that provides a control function inside the optical sub-assembly.

13. The signal transmission system of claim 12, further comprising:
 a laser for transmitting an optical signal; and
 a laser driver circuit located inside the optical sub-assembly, the laser driver circuit configured to provide a drive signal to the laser, wherein an amplitude of the drive signal is controlled by the analog control signal.

14. The signal transmission system of claim 10, wherein the signal receiver circuit comprises a register circuit configured to store at least a portion of the digital signal.

15. The signal transmission system of claim 14, wherein the register circuit incorporates a majority vote system for determining the validity of a portion of the digital signal.

16. A method of operating a bi-directional signal transmission system incorporated into an optical sub-assembly, the method comprising:
 carrying out an optical-to-electrical conversion for generating an analog signal;
 shifting the analog signal to a quiescent level to compensate for the first electrical signal falling below a threshold value;
 transmitting the analog signal out of a dual-purpose pin of the optical subassembly;
 pulling down the dual-purpose pin to a Low logic level for a first period of time;
 releasing the dual-purpose pin from the Low logic level for a second period of time;
 pulling down the dual-purpose pin to a Low logic level for a third period of time, wherein the first and the third periods of time are selected to modulate the analog signal for carrying digital information; and
 converting the digital information carried in the modulated analog signal into a control signal inside the optical sub-assembly.

17. The method of claim 16, wherein the analog signal transmitted out of the dual-purpose pin is a current signal that is proportional to the first electrical signal.

18. The method of claim 16, wherein maintaining the analog signal at a quiescent level comprises maintaining the analog signal at a voltage level that corresponds to a minimum operating threshold voltage for obtaining a High logic level out of a voltage level detector circuit configured to convert the modulated analog signal into the control signal.

19. A signal transmission system, comprising:
a first communications component in which is housed a transmitter optical sub-assembly (TOSA), the TOSA including a dual-purpose pin for propagating an analog signal out of the TOSA and for providing an access point whereby an external element may be coupled to the TOSA for modulating the analog signal, the modulated analog signal being used thereon to generate a control signal inside the TOSA, wherein the analog signal is a current output signal, wherein the TOSA is configured to maintain the current output signal at a quiescent current level when the first electrical signal falls below a threshold level, wherein the external element is a switching element located external to the TOSA, the switching element operable to generate the modulated analog signal by coupling the dual-purpose pin to a ground potential for a selected period of time whereby the analog signal is transitioned to a Low logic level for the selected period of time.

20. The signal transmission system of claim 19, wherein the TOSA is a five-pin package the five pins of the five-pin package consisting of the dual-purpose pin, a pair of power supply pins, and a pair of data signal pins.

21. The signal transmission system of claim 19, further comprising:
a second communications component communicatively coupled to the first communications component, the second communications component housing a receiver optical sub-assembly (ROSA), the ROSA including a dual-purpose pin for propagating an analog signal out of the ROSA and for providing an access point whereby an external element may be coupled to the ROSA for modulating the analog signal, the modulated analog signal being used thereon to generate a control signal inside the ROSA.

22. The signal transmission system of claim 21, wherein the ROSA is a five-pin package, the five pins of the five-pin package consisting of the dual-purpose pin, a pair of power supply pins, and a pair of data signal pins.

* * * * *